United States Patent
Yamane et al.

(10) Patent No.: US 6,523,176 B1
(45) Date of Patent: Feb. 18, 2003

(54) RESERVATION PROCESSING APPARATUS AND METHOD

(75) Inventors: Tetsuya Yamane, Kanagawa-ken (JP); Shigeyasu Natsubori, Kanagawa-ken (JP); Toshiya Takahashi, Chiba-ken (JP); Shozo Isobe, Kanagawa-ken (JP); Toru Imai, Tokyo (JP); Shigeru Oyanagi, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/261,127

(22) Filed: Mar. 3, 1999

(30) Foreign Application Priority Data

Mar. 4, 1998 (JP) ............................................ 10-052002

(51) Int. Cl.⁷ ........................... H04N 5/445; H04N 5/76
(52) U.S. Cl. ............................... 725/58; 386/1; 386/83
(58) Field of Search ........................ 386/1, 83; 725/40, 725/41, 58, 104, 87

(56) References Cited

U.S. PATENT DOCUMENTS

| | | | |
|---|---|---|---|
| 4,706,121 A | | 11/1987 | Young |
| 5,541,738 A | * | 7/1996 | Mankovitz |
| 5,945,987 A | * | 8/1999 | Dunn ........................... 345/327 |
| 6,078,348 A | * | 6/2000 | Klosterman et al. ........... 348/10 |
| 6,091,884 A | * | 7/2000 | Yuen et al. ..................... 386/83 |
| 6,323,911 B1 | * | 11/2001 | Schein et al. ................ 348/552 |
| 6,344,878 B1 | * | 2/2002 | Emura ......................... 348/460 |
| 6,353,444 B1 | * | 3/2002 | Katta et al. .................. 345/716 |
| 6,370,317 B2 | * | 4/2002 | Nagano et al. ................ 386/83 |
| 6,426,779 B1 | * | 7/2002 | Noguchi et al. ............. 348/569 |
| 6,441,862 B1 | * | 8/2002 | Yuen et al. .................. 348/565 |

FOREIGN PATENT DOCUMENTS

WO    WO 97/49237    * 12/1997    .......... H04N/5/445

* cited by examiner

Primary Examiner—John Miller
Assistant Examiner—Annan Q. Shang
(74) Attorney, Agent, or Firm—Finnegan, Henderson, Farabow, Garrett & Dunner, L.L.P.

(57) ABSTRACT

A reservation processing apparatus. A data receiving section receives broadcast data including mainview data and preview data. The preview data represents information of next mainview data. A preview data record section records the preview data received by the data receiving section. A reservation list management section extracts the information of next mainview data from the preview data and stores the information as a reservation list. A reservation item execution section records the next mainview data according to the reservation list when the data receiving section receives the next mainview data transmitted.

21 Claims, 19 Drawing Sheets

FIG.3

| START TIME | END TIME | INDICATION OF RESERVATION PERFORMANCE APPARATUS | PROGRAM NUMBER | PROGRAM NAME | SERIES NUMBER | SUB TITLE |
|---|---|---|---|---|---|---|
| JAN. 2, '99 12:00 | JAN. 2, '99 13:30 | SOUND AND IMAGE THROUGH TV DISPLAY | 1022313 | "TITANIC" | 2 | LATTER PART |
| JAN. 3, '99 21:00 | JAN. 3, '99 22:30 | SOUND AND IMAGE THROUGH VCR | 6042334 | "GODZILLA" | 2 | LATTER PART |
| JAN. 5, '99 20:00 | JAN. 5, '99 20:50 | SOUND AND IMAGE THROUGH TV DISPLAY | 3087293 | "LOST IN SPACE" | 26 | "THE SPACE TREASURE" |

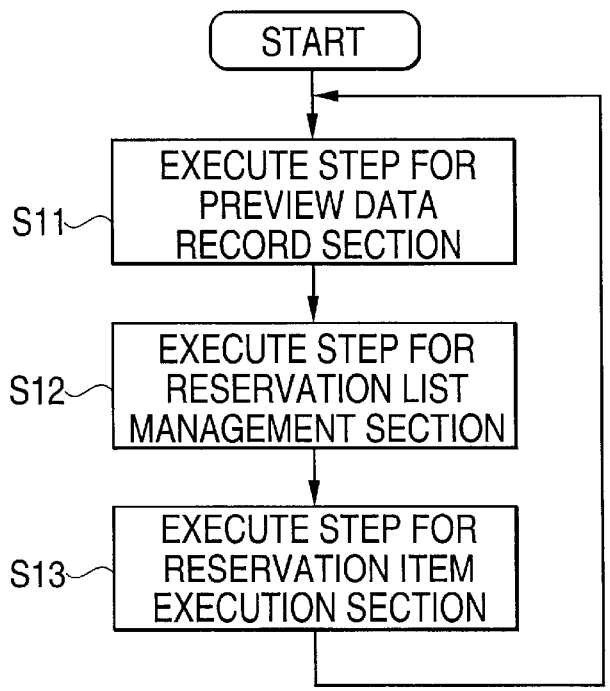
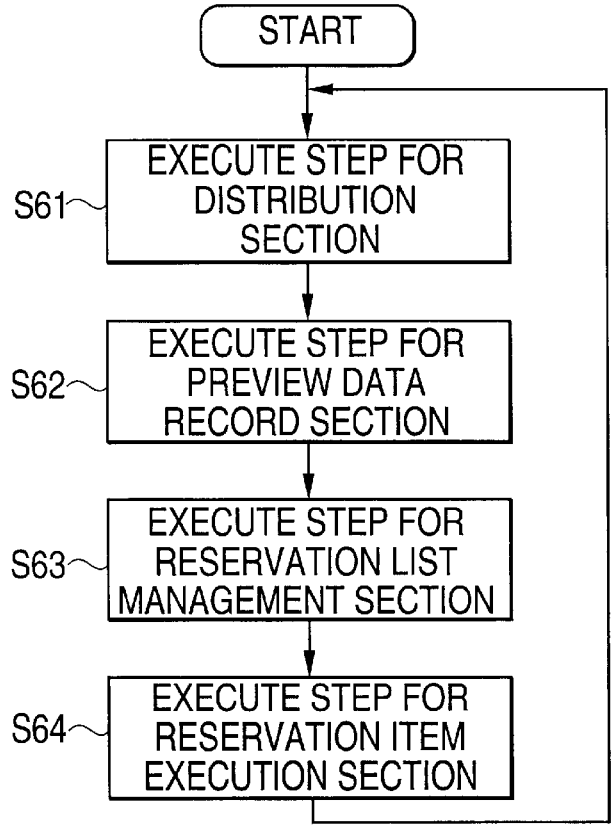

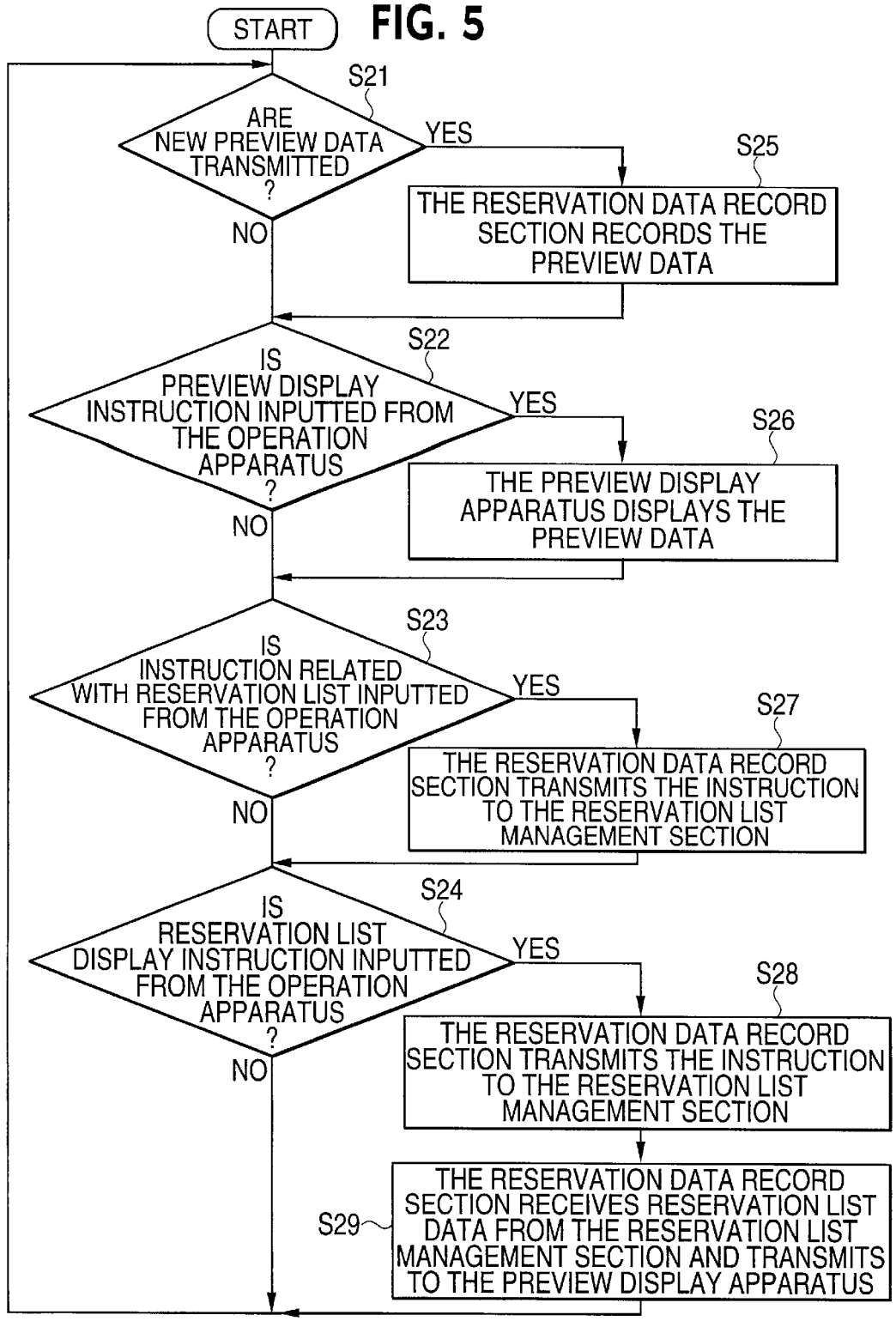

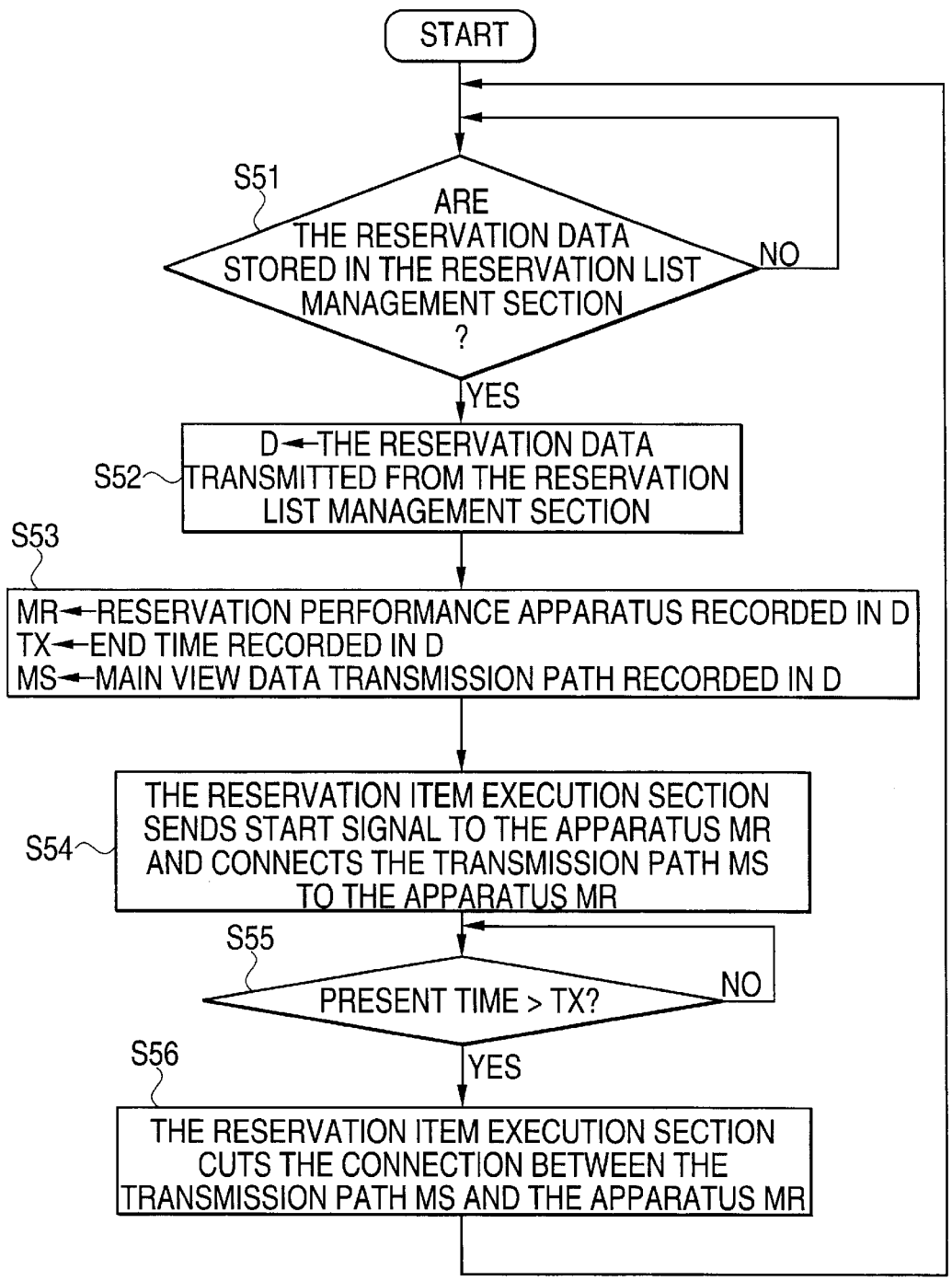

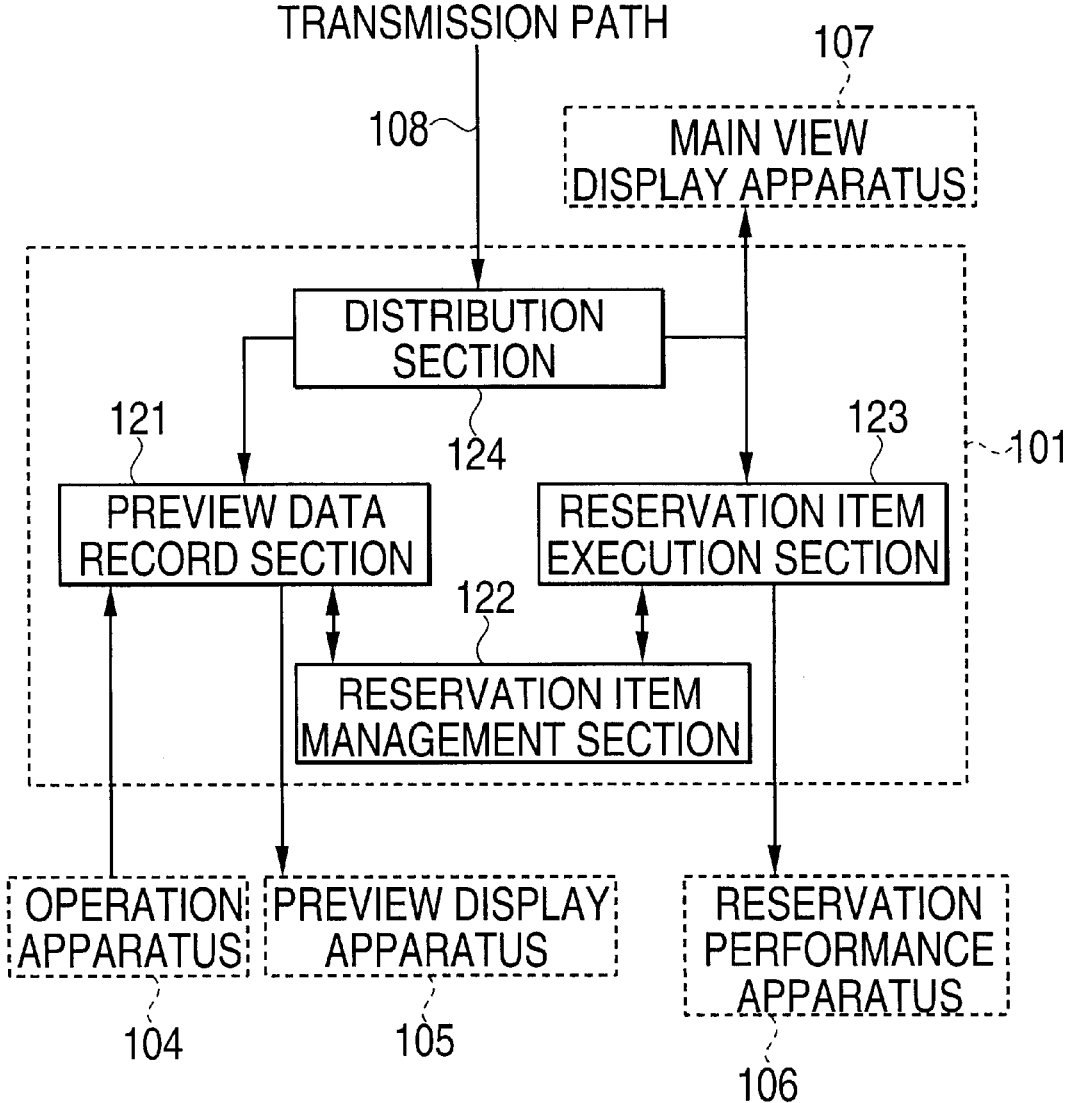

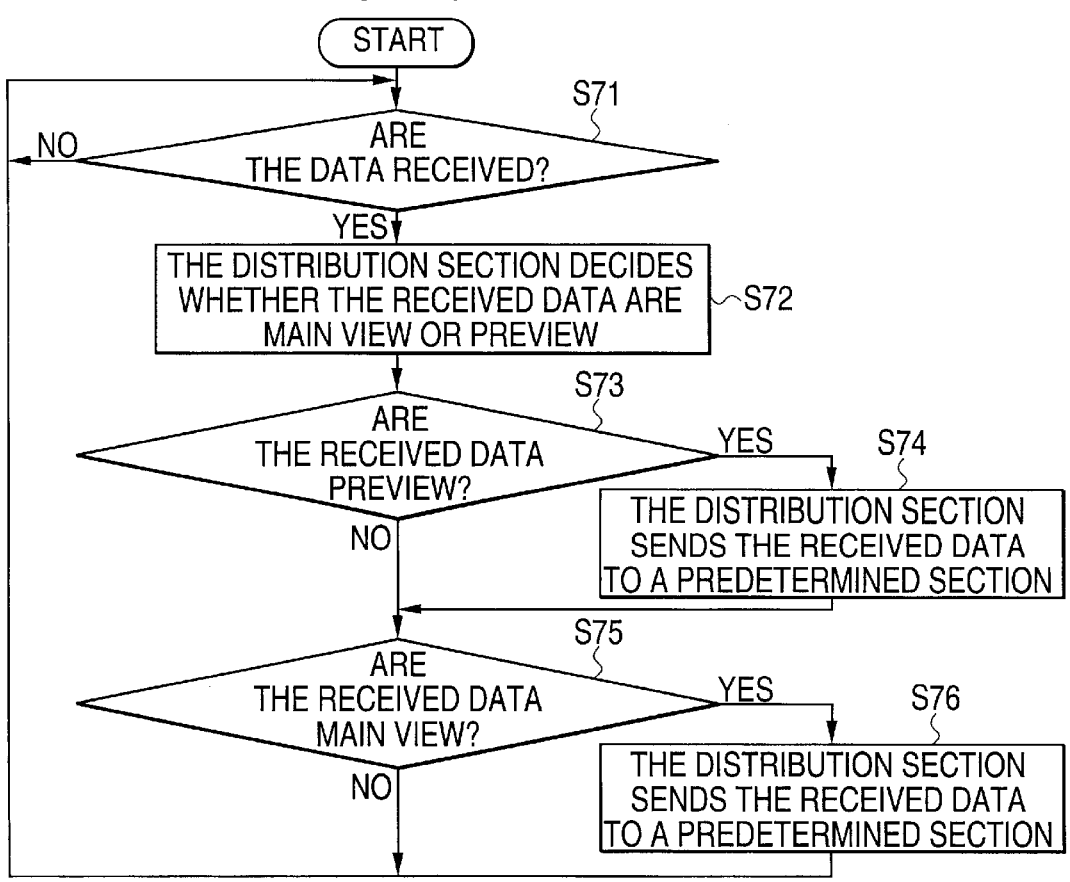

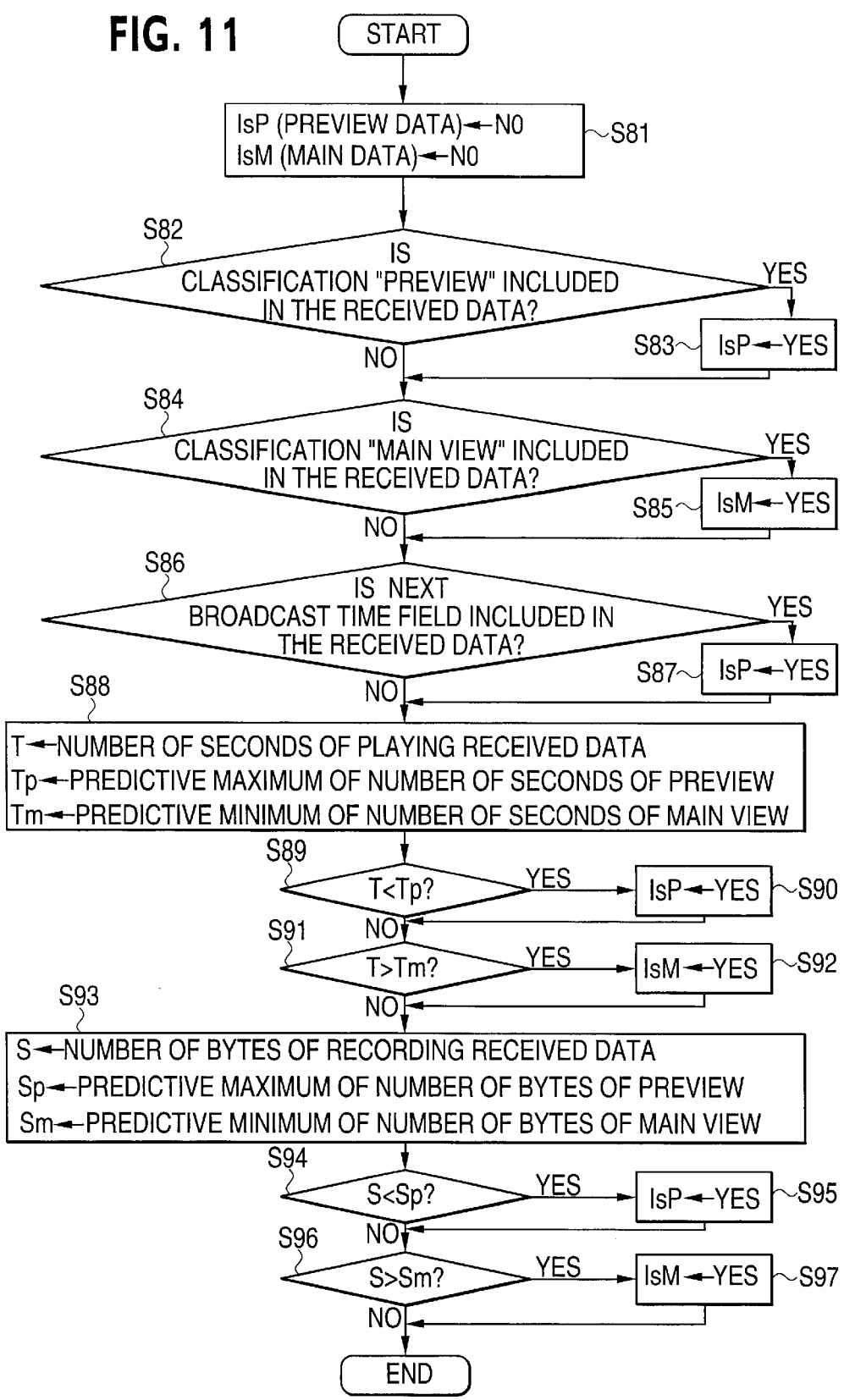

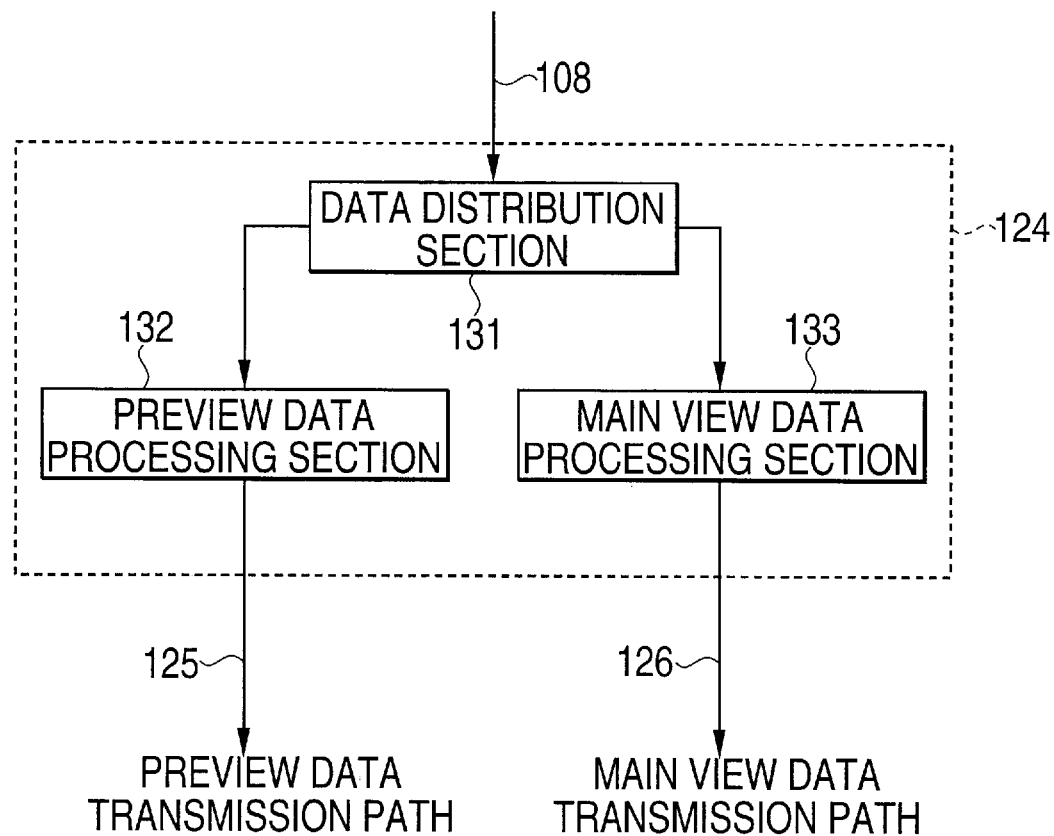

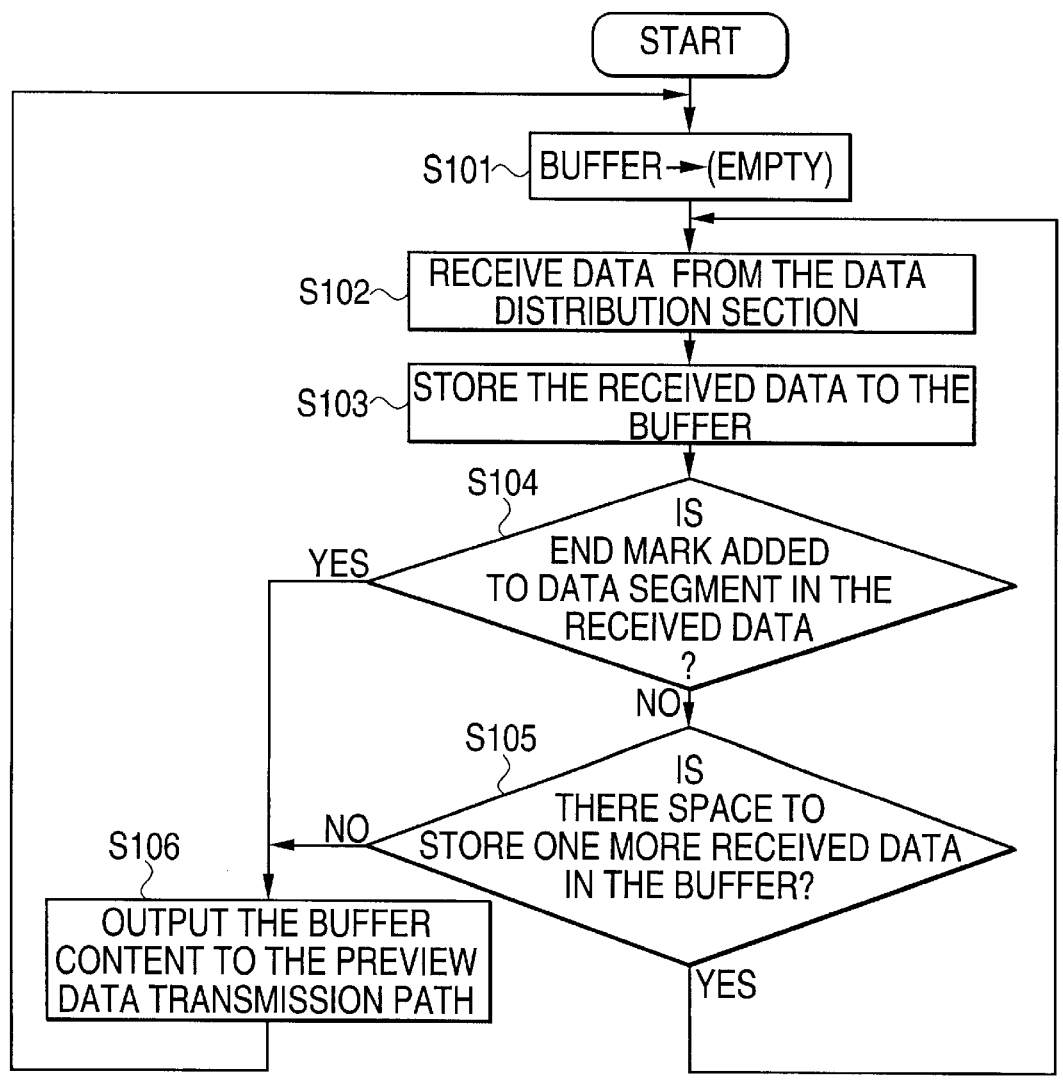

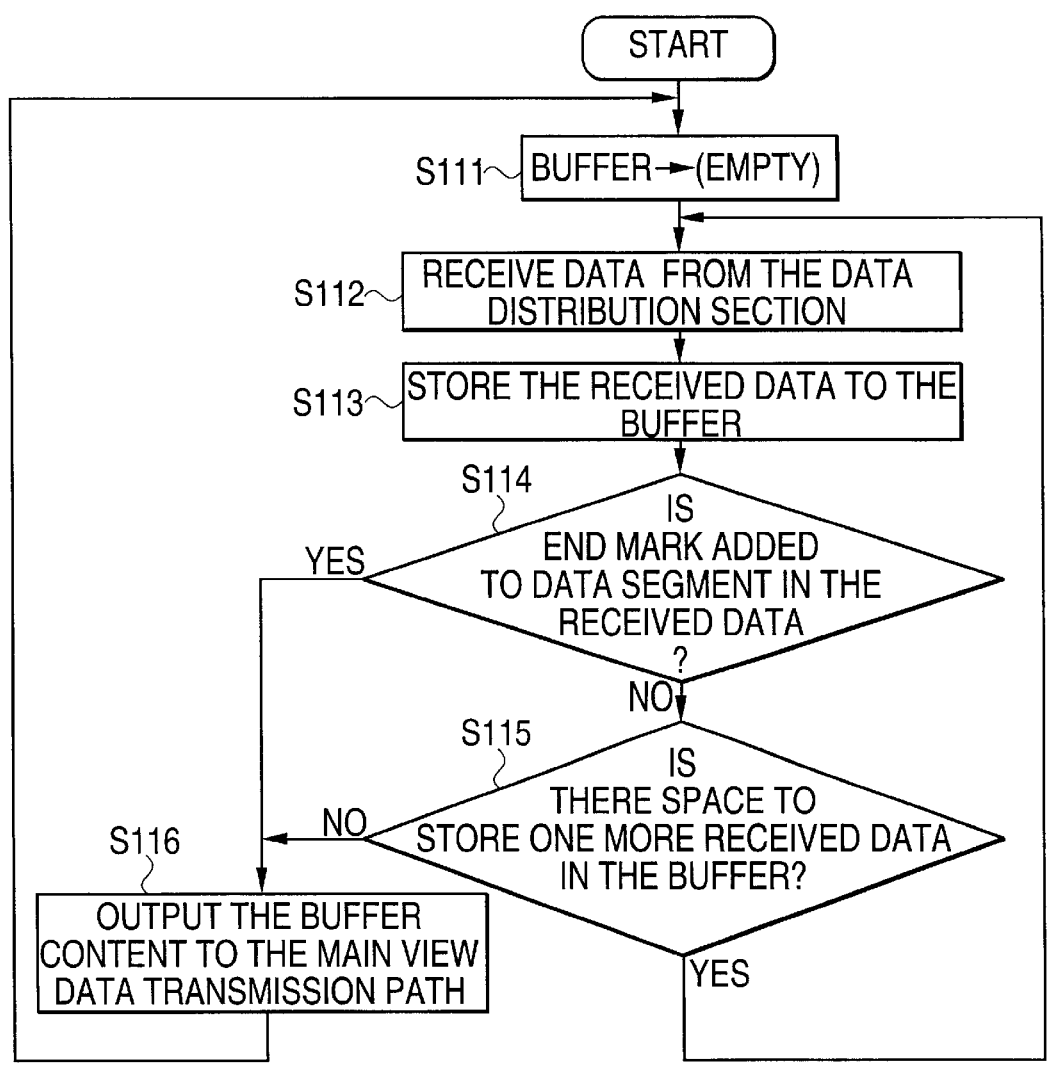

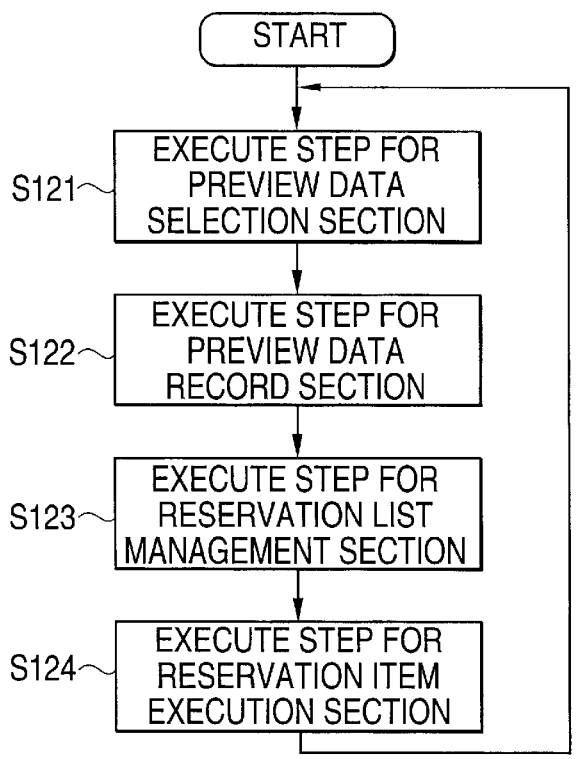
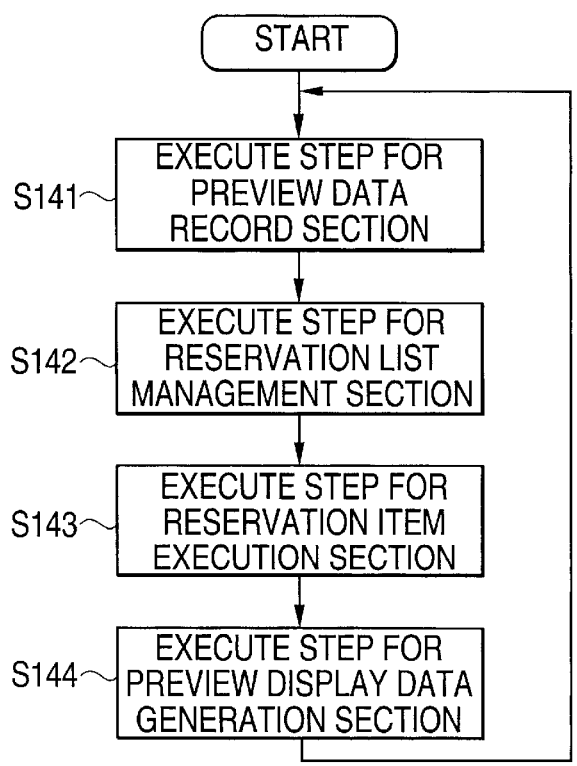

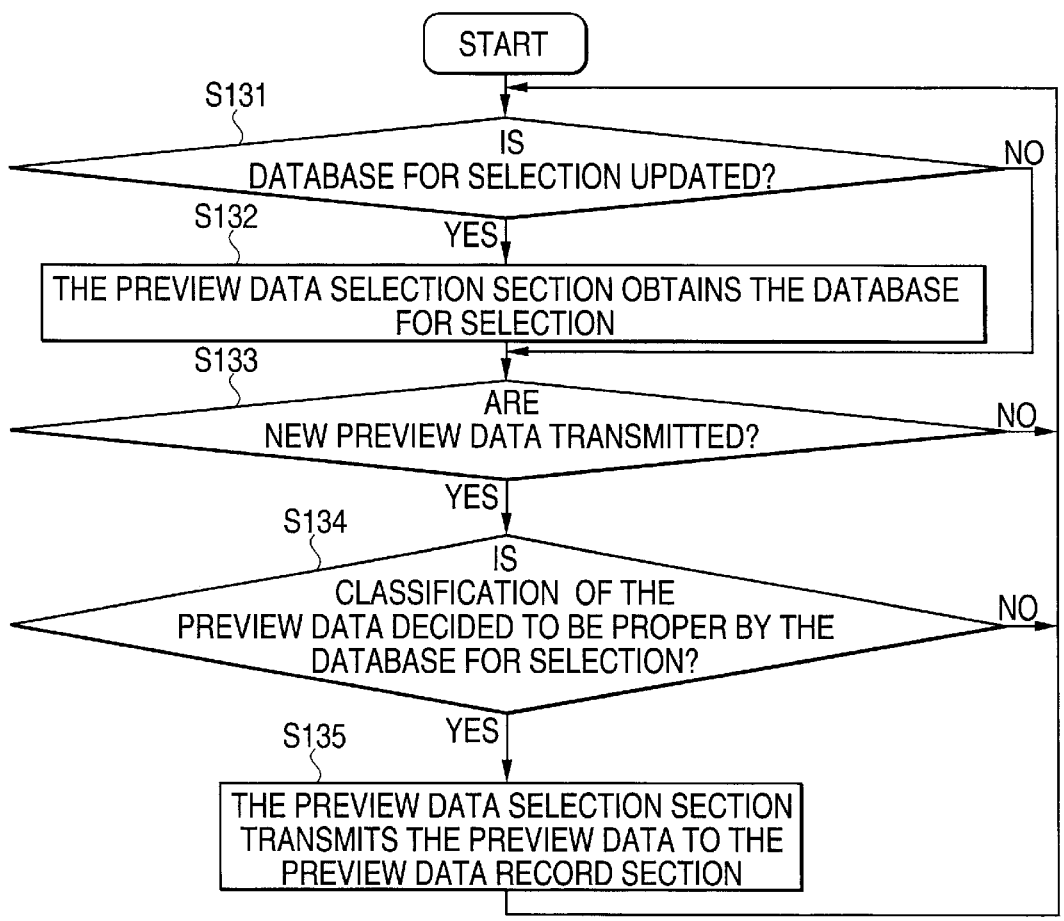

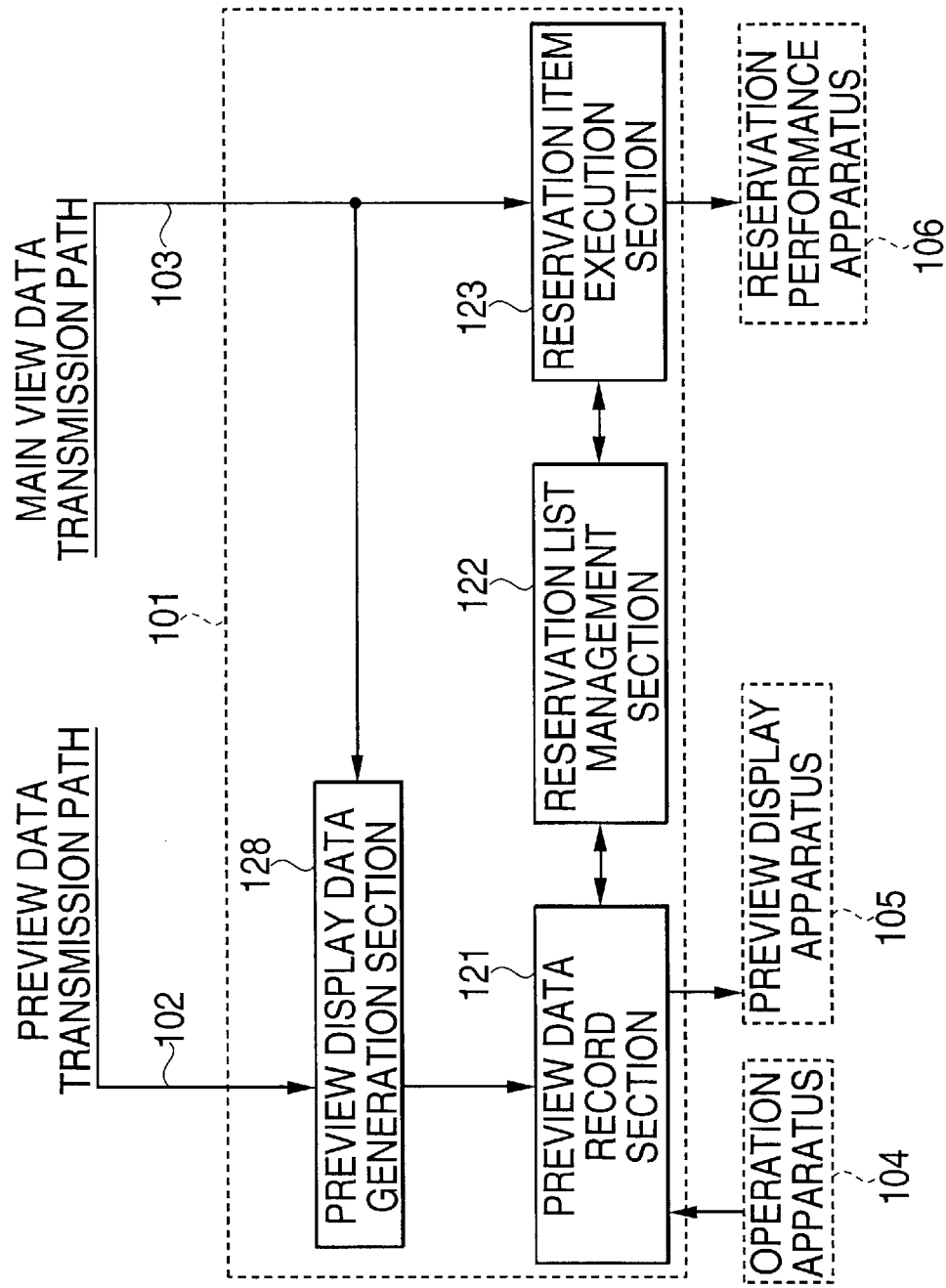

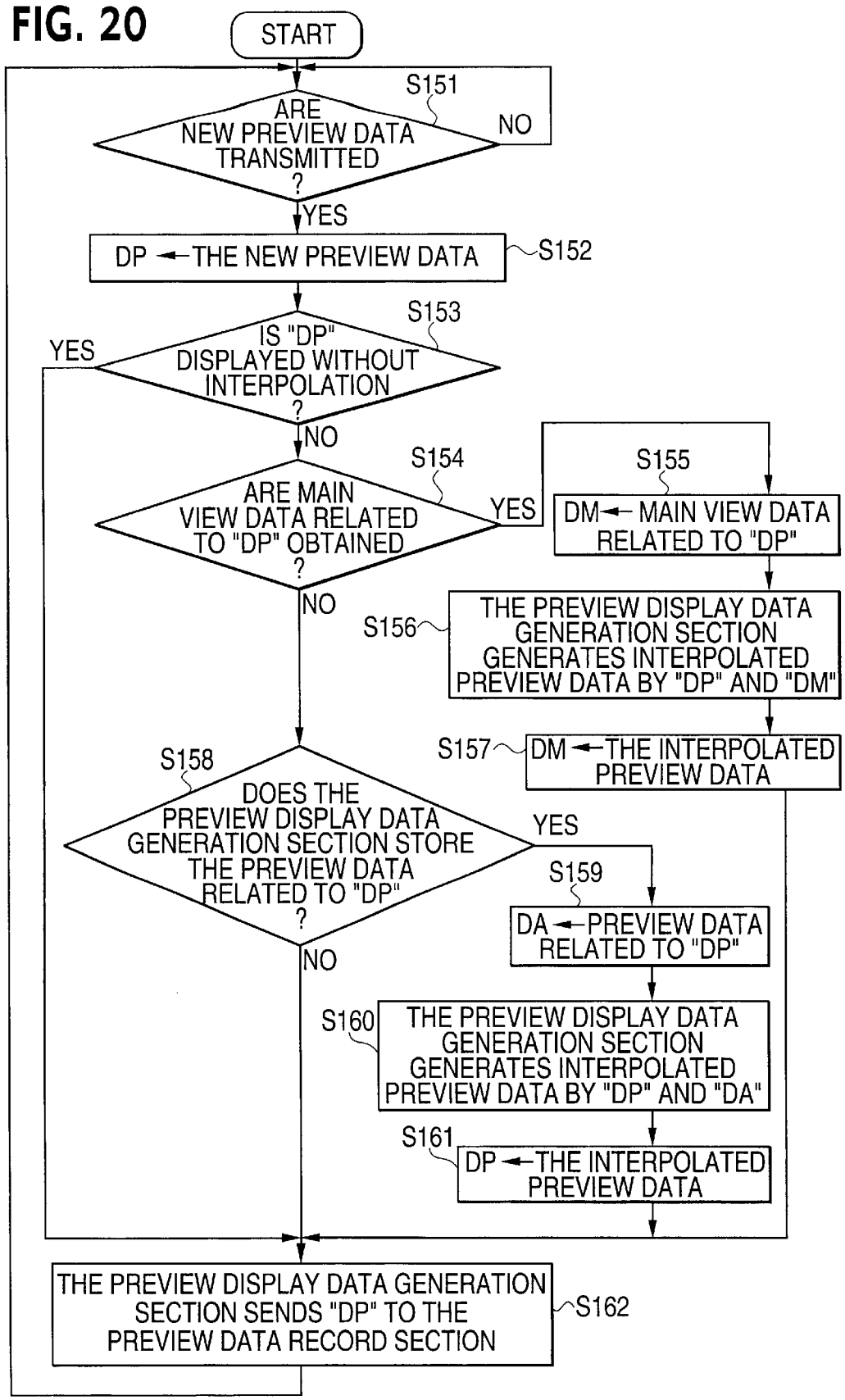

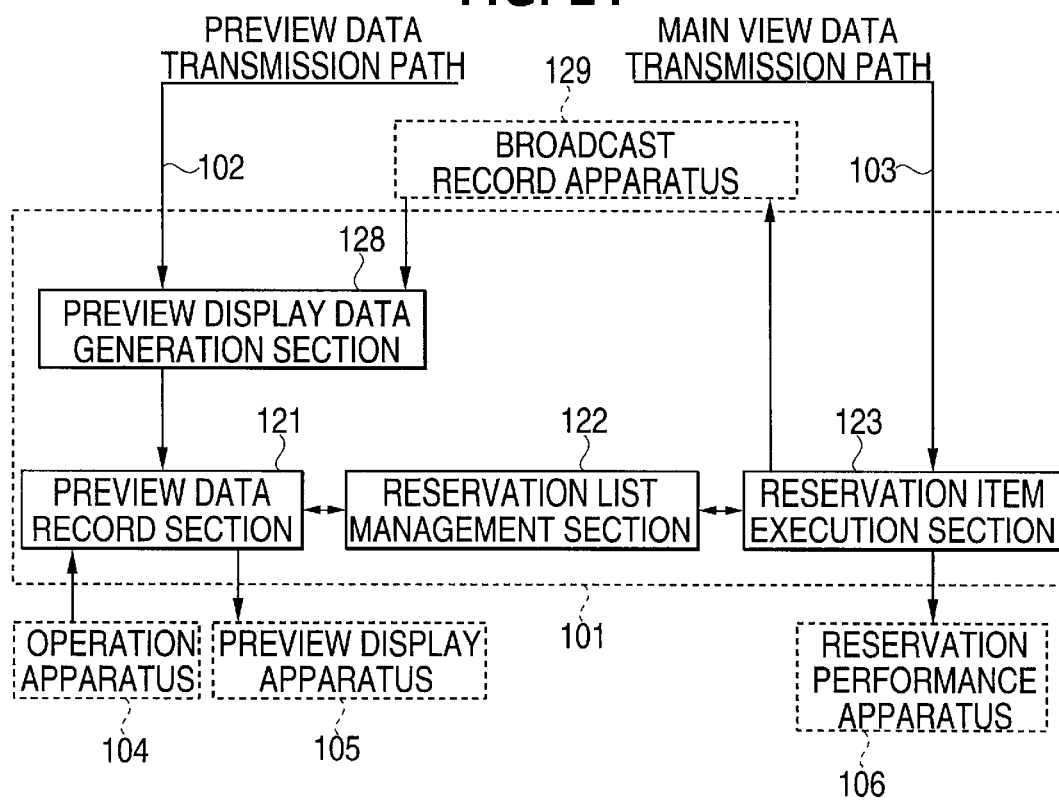

RESERVATION PROCESSING APPARATUS AND METHOD

BACKGROUND OF THE INVENTION

1. Field of the Invention

The present invention relates to a reservation processing apparatus and a method for receiving broadcast data including mainview data and preview data, and for reserving mainview data corresponding to the preview data.

2. Description of the Related Art

In the prior art, as an indication means to reserve a recording of a television broadcasting program by a video recorder or deck, there are a first method for directly indicating items such as channel and broadcast time period of a user's desired program, a second method for inputting a number by G code (Gemstar code) ID, and a third method for inputting a number by bar code ID. The G code ID corresponding to each TV program is already printed in a TV program magazine such as "weekly TV guide" in Japan. The bar code ID corresponding to each TV program is already printed in the TV program area of, for example, a newspaper. Therefore, the user scans the G code ID or the bar code ID corresponding to his desired TV program using a POS terminal connected to the video deck in order to reserve the recording.

However, in the first method, the number of indication items is large and the user's input operation is complicated. In the second method, the number of the G code ID is often erroneously inputted by the user. In addition to this, in the second method and the third method, extra fixed information (for example, a printed mark or sign) is necessary in the space of the TV magazine or newspaper.

In short, in an operation mechanism to reserve telerecording as the prior art, the user must input number, mark, or sign that is unrelated to the content of TV program. Therefore, operation is troublesome for the user, and input or operation error often occurs.

On the other hand, for a large number of actual broadcast data of TV program, the broadcast data includes mainview data and preview data in general. For example, in case the mainview data of a particular TV program is broadcast once a week, the preview data represents a summary of the next mainview data, which follows in a short time. However, in the prior art, the preview data cannot be used to reserve the recording of the next mainview data. In short, though the preview data including information of next mainview data is broadcast in advance, a method to reserve the recording of the next mainview data by using the preview data is not considered.

SUMMARY OF THE INVENTION

It is an object of the present invention to provide a reservation processing apparatus and method that can automatically reserve the recording of next mainview data of TV program by using the preview data broadcast with the present mainview data.

According to the present invention, there is provided a reservation processing apparatus, comprising: a data receiving means for receiving broadcast data including mainview data and preview data transmitted, the preview data representing information of the next mainview data as a sequel of the mainview data; a preview data record means for recording the preview data received by said data receiving means; a reservation list management means for extracting the information of the next mainview data from the preview data and for storing the information as a reservation list; and a reservation item execution means for recording the next mainview data according to the reservation list stored in said reservation list management means when said data receiving means receives the next mainview data transmitted.

Further in accordance with the present invention, there is provided a reservation processing method, comprising the steps of: receiving the broadcast data including mainview data and preview data transmitted, the preview data representing information of the next mainview data as a sequel of the mainview data; recording the preview data received at the receiving step; extracting the information of the next mainview data from the preview data; storing the information as a reservation list; and recording the next mainview data according to the reservation list stored at the storing step when the next mainview data is received.

Further in accordance with the present invention, there is provided a computer-readable memory, comprising: an instruction means for causing a computer to receive broadcast data including mainview data and preview data transmitted, the preview data representing information of next mainview data as a sequel of the mainview data; an instruction means for causing a computer to record the preview data received; an instruction means for causing a computer to extract the information of next mainview data from the preview data; an instruction means for causing a computer to store the information as a reservation list;

and an instruction means for causing a computer to record the next mainview data according to the reservation list when the next mainview data is received.

BRIEF DESCRIPTION OF THE DRAWINGS

FIG. 3 shows an example of the reservation list.

FIG. 4 is a flow chart of the reservation processing method according to the first embodiment of the present invention.

FIG. 5 is a flow chart of the processing of a preview data record section in FIG. 1.

FIG. 7 is a flow chart of the processing of a reservation item execution section in FIG. 1.

FIG. 8 is a block diagram of the reservation processing apparatus according to a second embodiment of the present invention.

FIG. 9 is a flow chart of the processing of the reservation processing method according to the second embodiment of the present invention.

FIG. 10 is a flow chart of the processing of a distribution section in FIG. 8.

FIG. 11 is a flow chart of the decision processing of data classification of the distribution section.

FIG. 12 is a block diagram of the distribution section in FIG. 8.

FIG. 13 is a flow chart of the processing of a preview data processing section in FIG. 12.

FIG. 14 is a flow chart of the processing of a mainview data processing section in FIG. 12.

FIG. 16 is a flow chart of the processing of the reservation processing method according to the third embodiment of the present invention.

FIG. 17 is a flow chart of the processing of a preview data selection section in FIG. 15.

FIG. 18 is a block diagram of the reservation processing apparatus according to a fourth embodiment of the present invention.

FIG. 19 is a flow chart of the processing of the reservation processing method according to the fourth embodiment of the present invention.

FIG. 20 is a flow chart of the processing of a preview display data generation section in FIG. 18.

FIG. 21 is a block diagram of a modification of the reservation processing apparatus according to the fourth embodiment of the present invention.

DETAILED DESCRIPTION OF THE PREFERRED EMBODIMENTS

Embodiments of the present invention are described below with reference to the drawings.

First, the meanings of words used in the explanation are explained. "Mainview" is broadcast data of one independent TV program. "Preview" is broadcast data transmitted with mainview data, which represents a summary of the next mainview data. In this case, there is no distinction between mainview data and preview data. In short, the broadcast data may include both attributes of the mainview data and the preview data. In other words, the broadcast data includes at least one of the mainview data and the preview data. "Reservation" is known as a use for reserving the recording of the broadcast data, but it is not limited to this meaning. "Reservation" includes all operations (For example, recording, playing, displaying, transmitting to predetermined apparatus) used to process received mainview data. These operations are previously reserved while the mainview data is not received. "Reservation list" is a set to manage a plurality of reservations. "Broadcast data transmission path" is a path to send and receive the preview data and the mainview data. "Preview data transmission path" is a path to send and receive the preview data. "Mainview data transmission path" is a path to send and receive the mainview data. In this case, the preview data transmission path and the mainview data transmission path may be the same path. "Reservation performance apparatus" is an apparatus to actually execute according to the reservation program, such as recording equipment or display equipment controlled by software. For example, a recording function in the recording equipment corresponds to this. In this case, reservation performance corresponds to the recording. "Broadcast record apparatus" is an apparatus to record and transmit the broadcast data such as a VCR. "Mainview display apparatus" is an apparatus to display the mainview data. "Preview display apparatus" is an apparatus to display the preview data. "Operation apparatus" is an input interface apparatus such as remote controller in case the user operates the reservation. In this case, as the operation apparatus, a graphical user interface in which the remote controller is the input device is used. Furthermore, necessary input is operated by selection.

Each of the above-mentioned apparatus is connected to an information processing apparatus (the reservation processing apparatus) of the present invention as external apparatus. However, any one of above-mentioned each apparatus may be included in the information processing apparatus. Display devices (For example, crystal display or CRT) used for mainview display, preview display, or reservation list display may be separately set or commonly set as one body. Furthermore, the information processing apparatus of the present invention is composed of a general purpose computer, but may be included in a TV storing display function and record/play function of a TV program.

Figure 1:
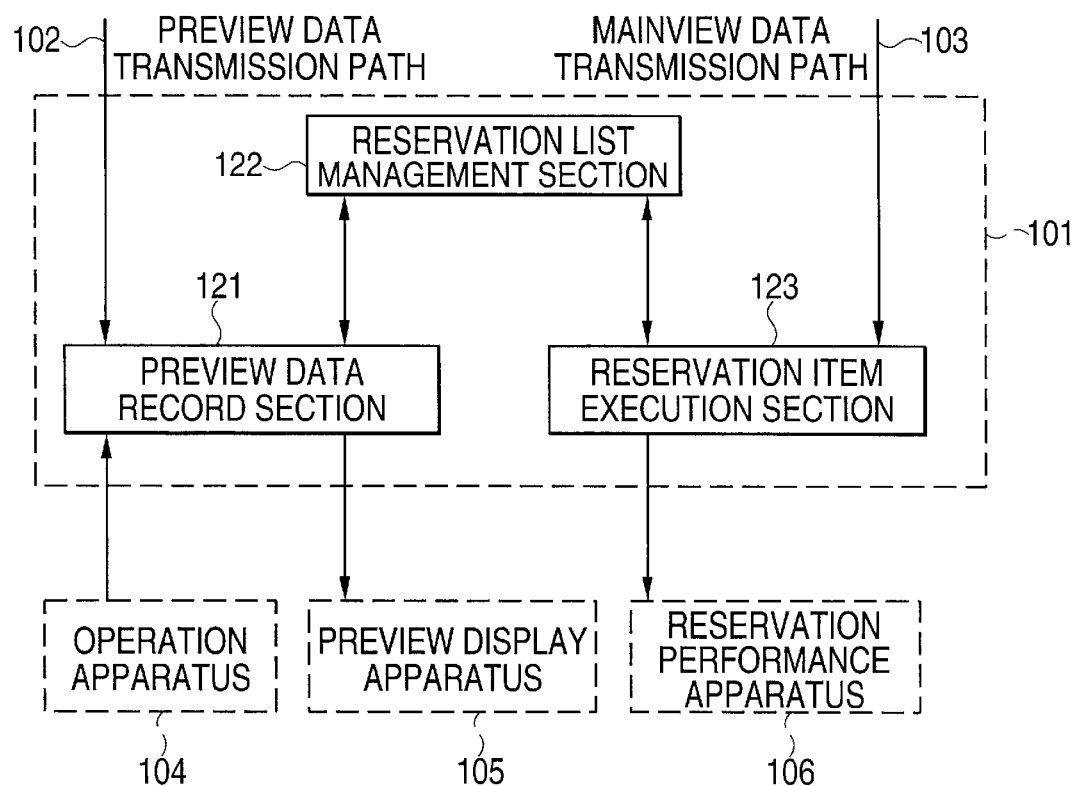
FIG. 1 is a block diagram of the reservation processing apparatus according to a first embodiment of the present invention.

FIG. 1 is a block diagram of the reservation processing apparatus according to the first embodiment. The reservation processing apparatus 101 includes a.preview data record section 121, a reservation list management section 122, and a reservation item execution section 123. The preview data record section 121 receives and records the preview data transmitted from a preview data transmission path 102, and outputs at least one part of the preview data or a reservation content to a preview display apparatus 105. The reservation list management section 122 manages the reservation list and activates a reservation item by referring to a clock. The reservation item execution section 123 receives the mainview data transmitted from a mainview data transmission path 103, and outputs the mainview data to a reservation performance apparatus 106 set by indication of the reservation item.

Figure 2:
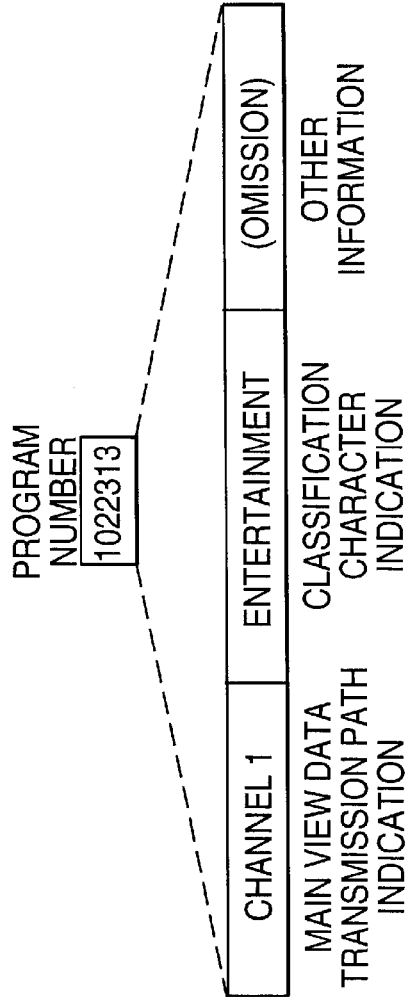
FIGS. 2A–2D show examples of the broadcast data.

FIGS. 2A–2C show one example of format of the broadcast data. FIG. 2A shows a first part of the mainview data. FIG. 2B shows the preview data indicating a latter part of the mainview data. FIG. 2C shows the latter part of the mainview data. FIG. 2D shows the data format of the program number as a head field of the broadcast data. The mainview data consists of a program number, program name, series number, sub title, classification, and content. The preview data consists of a program number, program name, series number, sub title, classification, content, and broadcast time period.

"Program number" is the ID assigned to each TV program. As shown in FIG. 2D, a mainview data transmission path indication and a classification character indication are extracted from the program number. "Program name" represents a title assigned to each program number. "Series number" represents the number of times of broadcast for the same program number. In case of a single-program, the series number is set as "0", "–1", or "null".

"Sub title" is a name assigned to each time of broadcast, which is uniquely determined by the program number and the series number. "Classification" represents the broadcast data as the mainview or the preview. In FIG. 2B, the preview data of the series number "2" is a preview of the mainview data of the series number "2". Some broadcast data includes common content such as the mainview and the preview, or neither the mainview nor the preview. The classification does not distinguish between the mainview and the preview.

For example, two bits of mainview flag and preview flag are set as the classification field. When "(mainview, preview)=(1, 0)", the classification is the mainview. When "(mainview, preview)=(0, 1)", the classification is the preview. In case that "(mainview, preview) =(1, 1)", the classification is both the mainview and the preview. When "(mainview, preview)=(0, 0)", the classification is neither the mainview nor the preview. In this case, the series number consists of the mainview series number and the preview series number. When "(mainview, preview)=(1, 1)", both the mainview series number and the preview series number are described. Furthermore, when "(mainview, preview)=(1, 1) and the series number "n"", the series number of the mainview data is "n" and the series number of the preview data is "n+1". "Content" is the program data to be displayed or output as the broadcast data. For example, in FIG. 2A, a first part of the mainview data of the first part of "TITANIC" of program number "1022313" is shown.

FIG. 3 shows one example of the reservation list. In the reservation list, each reservation item as an element of the list is arranged vertically. Each reservation item consists of a start time, end time, indication of reservation performance apparatus, program number, program name, series number, and sub title. In FIG. 3, the fields of program number, program name, series number, sub title are the same as each field in FIGS. 2A~2C. Each start time and end time value is extracted from the broadcast time period in the preview data of FIG. 2B. "Start time" represents a time to start the execution of the reservation of the mainview. "End time" represents a time to complete the execution of the reservation of mainview. "Indication of reservation performance apparatus" represents the indication of the external apparatus to execute the reservation and the description of use set. This item is set by the user's input through the operation apparatus. For example, as for the reservation list of the first line in FIG. 3, a latter part of the program name "TITANIC" whose program number is 1022312 is output (recorded) through a TV display as sound and image from Jan. 2, 1999, 12:00 to Jan. 2, 1999, 13:30. The reservation list may include additional information useful for the user in comparison with FIG. 3.

FIG. 4 is a basic flow chart of the processing of the reservation processing method of the first embodiment. In this case, the preview data record section 121 executes (S11), the reservation list management section 122 executes (S12), and the reservation item execution section 123 executes (S13). Each section preferably activates in order, however, each section may independently activate in synchronization with an input/output signal of a related section.

FIG. 5 is a flow chart of the processing of the preview data record section 121. When the preview data shown in FIG. 2B is inputted from the preview data transmission path 102, the preview data record section 121 receives and records the preview data (S21, 25). In case the memory lacks capacity to store, the preview data recorded in predetermined past is deleted.

Alternatively, the preview data record section 121 connects to an external apparatus applicable for recording and sends the preview data to the external apparatus. When a preview display instruction is input through the operation apparatus 104 by the user, the preview data record section 121 outputs the content of the preview data to the preview display apparatus 105 (S22, 26). In this case, even if the preview display instruction is not received, the preview data record section 121 may output the preview data according to the decision process of displaying the preview data.

In the first embodiment, the preview data record. section 121 receives all input from the operation apparatus 104, and outputs an indication of the processing of the reservation to the reservation list management section 122 without processing by itself. For example, when the preview data record section 121 receives a reservation instruction distinct from the preview display instruction from the operation apparatus 104, the reservation instruction is output to the reservation list management section 122 (S23, 27). In case of a reservation list display instruction, the preview data record section 121 receives the reservation list from the reservation list management section 122 and outputs it to the preview display apparatus 105 (S24, 28, 29). In this case, data input/output between the operation apparatus 104 and the reservation list management section 122, and between the reservation list management section 122 and the preview display apparatus 105, may be executed through the preview data record section 121.

Figure 6:
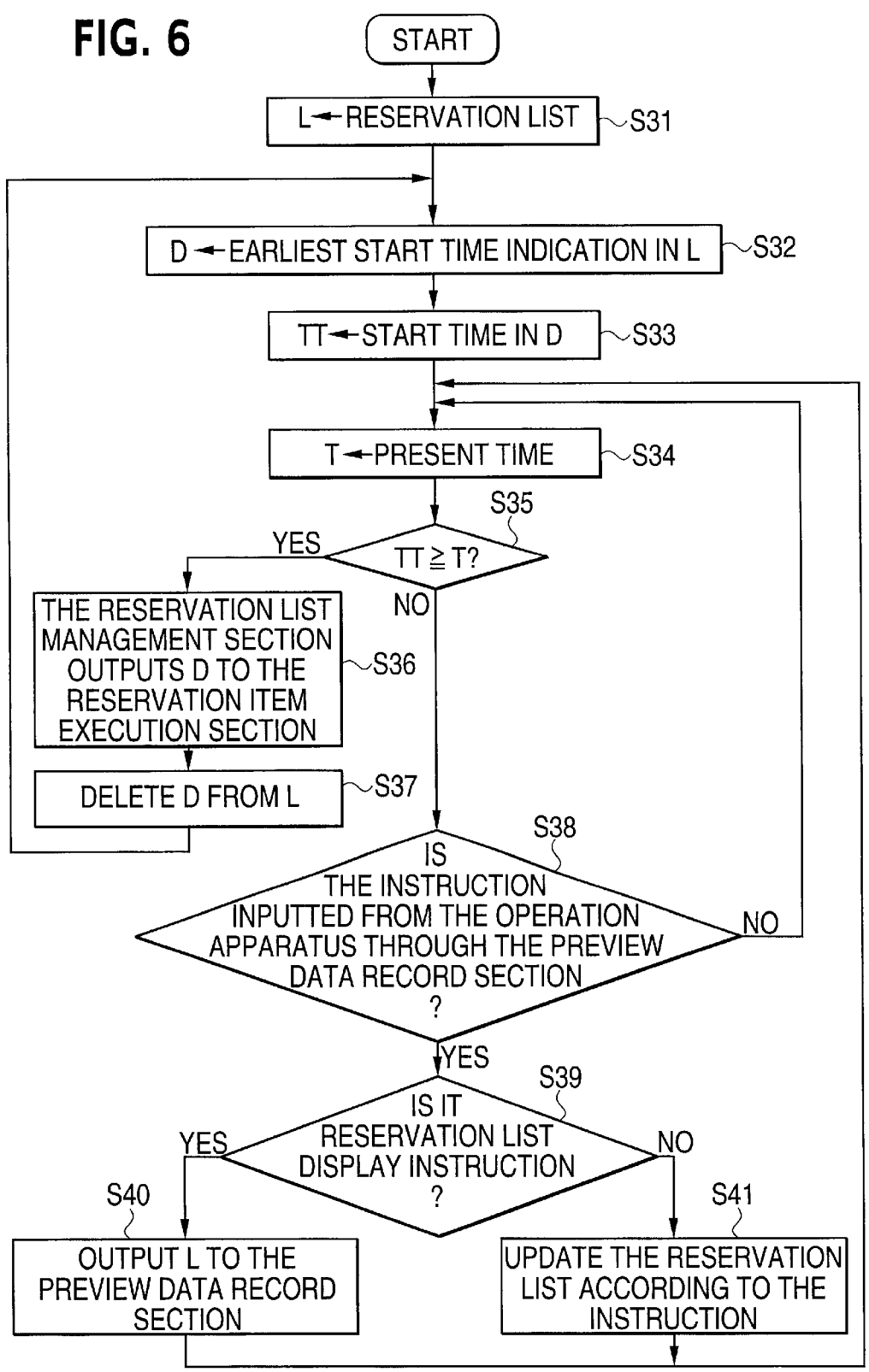
FIG. 6 is a flow chart of the processing of a reservation list management section in FIG. 1.

FIG. 6 is a flow chart of the processing of the reservation list management section 122. The reservation list management section 122 creates, records, and manages the reservation list. In case the memory lacks capacity to record, the reservation list management section 122 connects an external apparatus applicable for recording the reservation list, and sends the reservation list to the external apparatus. First, by referring to a present time, if the start time of one of the reservation lists is coming soon, this one reservation list is outputted to the reservation item execution section 123, and deleted from the reservation lists (S31~37). In the first embodiment, the input/output related to the reservation item from external apparatus is transmitted through the preview data record section 121. If an instruction related to the reservation item is inputted through the preview data record section 121 and it is the reservation list display instruction, the reservation list or a processed reservation list for display is outputted to the preview data record section 121. If the input instruction is an instruction to process the reservation list such as new registration, update or delete, the reservation list is processed according to the instruction (S38~41). For example, in case the preview data shown in FIG. 2B is displayed through the preview display apparatus 105 and the reservation instruction is inputted through the operation apparatus 104, the reservation list at the first line in FIG. 3 is registered.

FIG. 7 is a flow chart of processing of the reservation item execution section 123. The reservation item execution section 123 executes the reservation processing whose start time is coming. The reservation item execution section 123 has a function to independently manage a plurality of reservation items at the same time. First, the reservation item execution section 123 receives the reservation item data (one reservation list) whose start time is coming (S51), and extracts information such as the end time, the indication of reservation performance apparatus, and the mainview data transmission path. By using this information, the mainview data transmitted from the mainview data transmission path 103 is output to the reservation performance apparatus 106 until the end time (S52~55).

Furthermore, the reservation item execution section 123 has a function to send all or part of the reservation item data to the reservation performance apparatus 106 after connection between the mainview data transmission path 103 and the reservation performance apparatus 106. As already mentioned, the performance apparatus may display and/or record the performance. When the present time coincides with the end time, the reservation item execution section 123 cuts the connection between the mainview data transmission path 103 and the reservation performance apparatus 106 (S56).

As mentioned-above, in the first embodiment, in comparison with the data operation means of the prior art, a second mainview data is automatically reserved by using the preview data transmitted with a first mainview data. In short, operation error or mistaking the mainview data is suppressed because information (number, code) irrelevant to content of the mainview data is not input by the user. Furthermore, the preview data whose content is reflected in the next view data to be reserved is used. Therefore, the user can decide whether the next mainview data is reserved by watching the preview data or the reservation list.

Next, the second embodiment of the present invention is explained. FIG. 8 is a block diagram of the reservation processing apparatus according to the second embodiment. As shown in FIG. 8, the reservation processing apparatus 101 includes the preview data record section 121, the reservation list management section 122, the reservation item execution section 123 and a distribution section 124. Each function of the preview data record section 121, the reservation list management section 122, and the reservation item execution section 123 is the same as the first embodiment. The distribution section 124 receives the broadcast data transmitted from a broadcast data transmission path 108. FIG. 9 is a basic flow chart of processing of the reservation processing method according to the second embodiment. The distribution section 124 executes (S61), the preview data record section 121 executes (S62), the reservation list management section 122 executes (S63), and the reservation item execution section 123 executes (S64). The execution of these steps is arbitrarily repeated.

FIG. 10 is a flow chart of the processing of the distribution section 124. When the broadcast data consisting of the preview data and the mainview data is transmitted through the broadcast data transmission path 108, the distribution section 124 receives the broadcast data (S71), and outputs the broadcast data to a predetermined section (for example, the preview data record section 121) in case of the preview data (S72, 73, 74). The distribution section 124 outputs the broadcast data to a predetermined section (For example, the reservation item execution section 123) in case of the mainview data (S72, 75, 76). If the broadcast data is determined to be both the preview data and the mainview data, the broadcast data is output to both predetermined sections, or one of the predetermined sections. In short, this selection may be indicated.

Furthermore, if a predetermined section to input the broadcast data being neither the preview nor the mainview is previously set, the broadcast data is outputted to this predetermined section.

FIG. 11 is a flow chart of the processing of the data decision (S72 in FIG. 10). First, "No" is set in IsP and IsM (S81). If the classification ID of "preview" is included in classification field of the received broadcast data, "Yes" is set in IsP (S82, 83). If the classification ID of "mainview" is included in classification field of the received broadcast data, "Yes" is set in IsM (S84, 85). If the next broadcast time field is included in the received broadcast data, "Yes" is set in IsP (S86, 87).

Next, the number of seconds of playing the received data is set in T, a predictive maximum of the number of seconds of playing the preview data is set in Tp, a predictive minimum of the number of seconds of playing the mainview data is set in Tm (S88). When "T<Tp", "Yes" is set in IsP (S89, 90). When "T>Tm", "Yes" is set in IsM (S91, 92).

Next, the number of bytes of recording the received data is set in S, a predictive maximum of number of bytes of recording the preview data is set in Sp, a predictive minimum of number of bytes of recording the mainview data is set in Sm (S93). When "<S(Sp", "Yes" is set in IsP (S94, 95). When "S>Sm", "Yes" is set in IsM (S96, 97).

The distribution section 124 outputs the mainview data to a mainview display apparatus 107, and the mainview display apparatus 107 displays the mainview data. This display is executed in parallel with the recording of the mainview data by the reservation performance apparatus 106.

FIG. 12 is a block diagram of the distribution section 124 in FIG. 8. As shown in FIG. 12, the distribution section 124 includes a data distribution section 131, a preview data processing section 132, and a mainview data processing section 133. The data distribution section 131 decides whether the broadcast data is the mainview data or the preview data, and outputs the broadcast data to at least one of the preview data processing section 132 and mainview data processing section 133. As mentioned-above, the detailed processing of the data distribution section 131 is shown in FIG. 11. The preview data processing section 132 receives the preview data and cumulatively stores the preview data until the stored preview data becomes the sufficient processing object. When the stored preview data becomes the sufficient processing object, the preview data processing section 132 outputs the stored preview data through the preview data transmission path 125. On the other hand, the mainview data processing section 133 receives the mainview data and accumulately stores the mainview data until the stored mainview data becomes sufficient processing object. When the stored mainview data becomes the sufficient processing object, the mainview data processing section 133 outputs the stored mainview data through the mainview data transmission path 126.

FIG. 13 is a flow chart of processing of the preview data processing section 132. When the preview data processing section 132 receives the preview data from the data distribution section 131, the preview data processing section 132 additionally stores the preview data in a data buffer (S102, 103). If the quantity of the preview data stored in the data buffer is above a threshold, or if available space in the data buffer is below a threshold, or if the preview data most recently stored includes an end mark, the preview data processing section 132 outputs all of the stored preview data through the preview data transmission path 125, and deletes all of the stored preview data in the data buffer (S104, 105, 106, 101).

FIG. 14 is a flow chart of the processing of the mainview data processing section 133. When the mainview data processing section 133 receives the mainview data from the data distribution section 131, the mainview data processing section 133 additionally stores the mainview data in a data buffer (S112, 113). If a quantity of the mainview data stored in the data buffer is above a threshold, or if available space in the data buffer is below a threshold, or if the mainview data most recently stored includes the end mark, the mainview data processing section 133 outputs all of the stored mainview data through the mainview data transmission path 126 and deletes all of the stored mainview data in the data buffer (S114, 115, 116, 111).

As mentioned-above, in the second embodiment, the broadcast data as single data flow is suitably distributed according to the classification of the broadcast data. In this case, as for the broadcast data including a plurality of classifications, the broadcast data is equally distributed to the corresponding processing section. Therefore, a plurality of classifications is assigned to the broadcast data.

Figure 15:
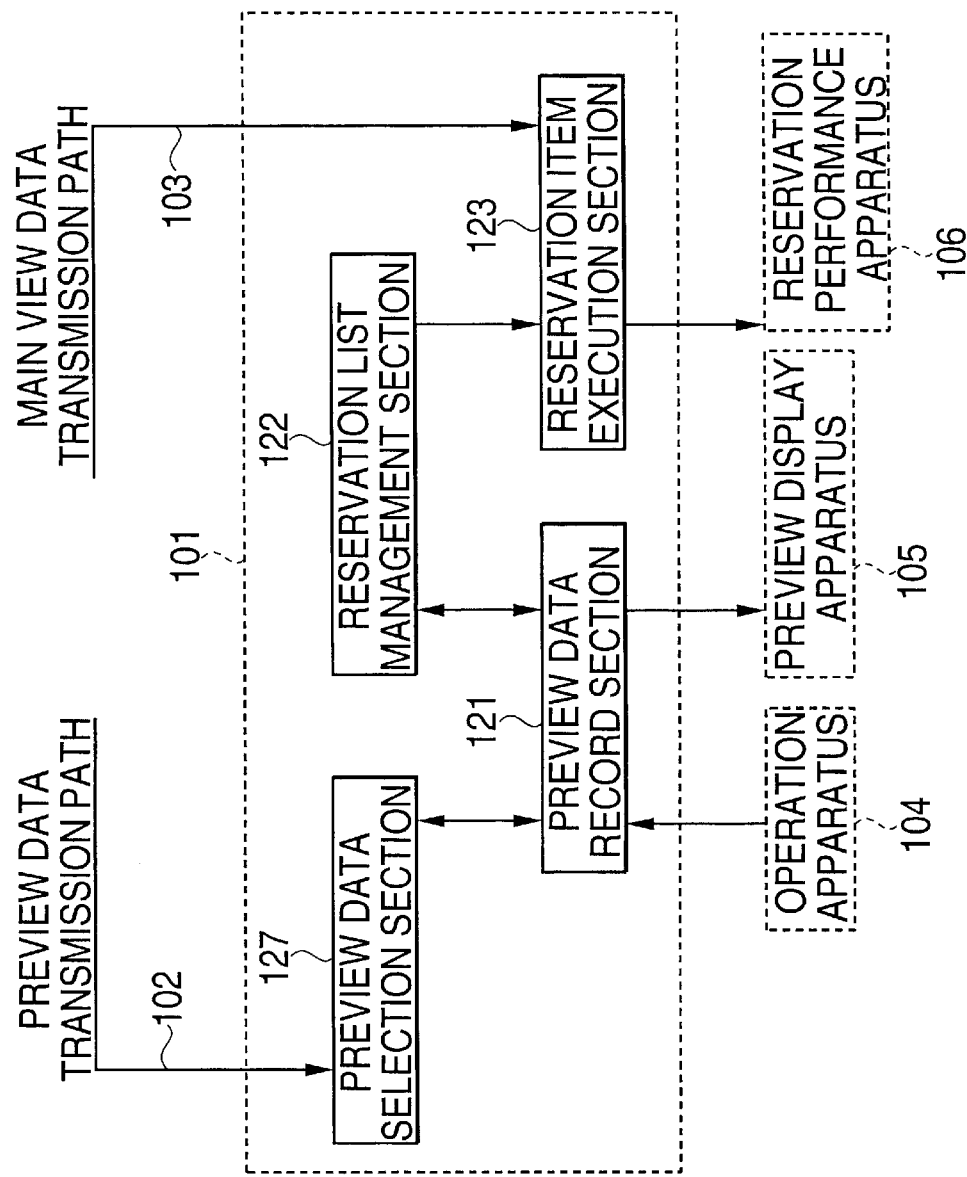
FIG. 15 is a block diagram of the reservation processing apparatus according to a third embodiment of the present invention.

FIG. 15 is a block diagram of the reservation processing apparatus according to a third embodiment of the present invention. As shown in FIG. 15, the reservation processing section 101 includes the preview data record section 121, the reservation list management section 122, the reservation item execution section 123, and a preview data selection section 127. Each of the preview data record section 121, the reservation list management section 122, and the reservation item execution section 123 is the same as the first embodiment in FIG. 1. When the preview data selection section 127 receives the preview data from the preview data transmission path 102, the preview data selection section 127 extracts the necessary part of the preview data or calculates the necessary part of the preview data by referring to a database for selection.

FIG. 16 is a flow chart of basic processing of the reservation processing apparatus according to the third embodiment. In this case, the preview data selection section 127 executes (S121), the preview data record section 121 executes (S122), the reservation list management section 122 executes (S123), and the reservation item execution section 123 executes (S124). The execution of these four steps is arbitrarily repeated.

FIG. 17 is a flow chart of the processing of the preview data selection section 127. If the database newly updated for selection is obtained from the preview data record section 121, the preview data selection section 127 newly sets the database for selection inside (S131, 132). When the preview data selection section 127 receives the preview data from the preview data transmission path 102, the preview data selection section 127 compares the preview data with the database for selection. If the classification of the preview data is determined to be proper by the database for selection, the preview data selection section 127 outputs the preview data to the preview data record section 121 (S133, 134, 135).

FIG. 18 is a block diagram of the reservation processing apparatus according to the fourth embodiment of the present invention. As shown in FIG. 18, the reservation processing apparatus 101 includes the preview data record section 121, the reservation list management section 122, the reservation item execution section 123, and a preview display data generation section 128. Each section of the preview data record section 121, the reservation list management section 122, and the reservation item execution section 123 is the same as in the first embodiment in FIG. 1. The preview display data generation section 128 receives the preview data from the preview data transmission path 102, and generates new preview data when the mainview data or another preview data related with the preview data is obtained.

FIG. 19 is a flow chart of the basic processing of the reservation processing apparatus according to the fourth embodiment. As shown in FIG. 19, the preview data record section 121 executes (S141), the reservation list management section 122 executes (S142), the reservation item execution section 123 executes (S143), and the preview display data generation section 128 executes (S144). The execution of these four steps is arbitrarily repeated.

FIG. 20 is a flow chart of the processing of the preview display data generation section 128. First, if the preview display data generation section 128 receives the preview data from the preview data transmission path 102, the preview display data generation section 128 decides whether this preview data is complete (S151~S153). For example, if the preview data does not include information to create the reservation list, the preview data is not complete, and the system will interpolate the preview data. If the preview data must be interpolated and other data (mainview data or preview data) related to this preview data is obtained, the preview display data generation section 128 interpolates this preview data by using the other data (S154~S157/S154, S158~S161), and outputs the interpolated preview data to the preview data record section 121 (S162).

In this case, as the other data used for interpolation of the preview data, the mainview data related to the preview data is searched first. If the mainview data related to the preview data is already obtained by the preview display data generation section 128, this mainview data is unconditionally used. Alternatively, if other preview data related to the preview data is already obtained by the preview display data generation section 128, the other preview data is unconditionally used. Furthermore, if the mainview data and the other preview data related to the preview data are already obtained, both the mainview data and the other preview data may be used for interpolation of the preview data.

Next, FIG. 21 is a block diagram of the reservation processing apparatus according to a modification of the fourth embodiment. As shown in FIG. 21, the reservation processing apparatus 101 includes the preview data record section 121, the reservation list management section 122, the reservation item execution section 123 and the preview display data generation section 128. Each section of the preview data record section 121, the reservation list management section 122, the reservation item execution section 123, and the preview display data generation section 128 is same as the reservation processing apparatus 101 in FIG. 18. In FIG. 21, a broadcast record apparatus 129 as an external apparatus records the mainview data. In FIG. 18, the preview display data generation section 128 directly obtains the mainview data used for interpolation from the mainview data transmission path 103. However, in FIG. 21, the preview display data generation section 128 indirectly obtains the mainview data from the broadcast record apparatus 129 as the external apparatus. In short, the broadcast record apparatus 129 specially records the mainview data used for interpolation. Therefore, the mainview data transmission path 103 need not temporarily store the mainview data and the preview display data generation section 28 need not directly obtain the mainview data from the mainview data transmission path 103. In this case, the preview display data generation section 128 may obtain the mainview data from both the mainview data transmission path 103 and the broadcast record apparatus 129.

A memory device, including a CD-ROM, floppy disk, hard disk, magnetic tape, or semiconductor memory can be used to store instructions for causing a processor or computer to perform the process described above.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A reservation processing apparatus, comprising:
    data receiving means for receiving broadcast data including mainview data and preview data, the preview data representing program information related to subsequent mainview data, the program information including a reservation item for broadcast of the subsequent mainview data;
    preview data record means for recording the preview data received by said data receiving means according to a reservation instruction;
    reservation list management means for extracting the reservation item of the subsequent mainview data from the preview data and for storing the reservation item in a reservation list; and
    reservation item execution means for recording the subsequent mainview data according to the reservation item stored in the reservation list when said data receiving means receives the subsequent mainview data.

2. The reservation processing apparatus according to claim 1,
    wherein the preview data includes a program number identifying the subsequent mainview data, a program name, a series number, a sub title, a classification as the preview, a summary, and a broadcast time period of the subsequent mainview data.

3. The reservation processing apparatus according to claim 2, wherein the reservation item in the reservation list includes a start time and an end time of the broadcast time period, the program number, the program name, the series number, and the sub title.

4. The reservation processing apparatus according to claim 3, further comprising an operation means for inputting a preview display instruction from a user, and further comprising a display means for displaying the preview data outputted from said preview data record means in response to the preview display instruction.

5. The reservation processing apparatus according to claim 4, wherein said operation means inputs a reservation list display instruction from the user, and wherein said display means displays the reservation list outputted from said reservation list management means in response to the reservation list display instruction.

6. The reservation processing apparatus according to claim 4, wherein said operation means inputs a registration instruction from the user while displaying the preview data, and wherein said reservation list management means registers the reservation item of the subsequent mainview data included in the preview data in response to the registration instruction.

7. The reservation processing apparatus according to claim 5, wherein said operation means inputs an update instruction from the user while displaying the reservation list, and wherein said reservation list management means updates the reservation list in response to the update instruction.

8. The reservation processing apparatus according to claim 3, wherein said reservation list management means extracts the earliest start time of the broadcast time period from the reservation list and decides whether the earliest start time is earlier than the present time.

9. The reservation processing apparatus according to claim 8, wherein said reservation list management means outputs the reservation item including the earliest start time to said reservation item execution means if the earliest start time is earlier than the present time, and deletes the reservation item including the earliest start time from the reservation list.

10. The reservation processing apparatus according to claim 9, wherein said reservation item execution means extracts the end time of the broadcast time period, names of a reservation performance apparatus and a transmission path to process the mainview data corresponding to the reservation item received, and connects the reservation performance apparatus with the transmission path.

11. The reservation processing apparatus according to claim 10, wherein said reservation item execution means cuts a connection between the reservation performance apparatus and the transmission path when the end time coincides with the present time.

12. The reservation processing apparatus according to claim 1, further comprising a data distribution means for determining whether broadcast data is the mainview data or the preview data when said data receiving means receives the broadcast data, and for outputting the broadcast data to a predetermined processing section according to classification of the broadcast data.

13. The reservation processing apparatus according to claim 12, wherein said data distribution means determines that the broadcast data is the preview data if a next broadcast time field is included in the broadcast data.

14. The reservation processing apparatus according to claim 13, wherein said data distribution means determines that the broadcast data is the preview data if a number of seconds for playing the broadcast data is smaller than a predictive maximum of the number of seconds for playing the preview data, and determines that the broadcast data is the mainview data if the number of seconds for playing the broadcast data is larger than a predictive minimum of the number of seconds for playing the mainview data.

15. The reservation processing apparatus according to claim 14, wherein said data distribution means determines that the broadcast data is the preview data if a number of-bytes for recording the broadcast data is smaller than a predictive maximum of the number of bytes for recording the preview data, and determines that the broadcast data is the mainview data if the number of bytes for recording the broadcast data is larger than a predictive minimum of the number of bytes for recording the mainview data.

16. The reservation processing apparatus according to claim 1, further comprising a preview data selection means for determining whether the classification of the preview data is proper according to a database for selection, and outputs the preview data to said preview data record means if the classification of the preview data is proper.

17. The reservation processing apparatus according to claim 1, further comprising a preview display data generation means for interpolating preview data using the mainview data related to the preview data if the preview data is incompleted and the mainview data related to the preview data is already inputted from said data receiving means.

18. The reservation processing apparatus according to claim 17, wherein said preview display data generation means interpolates preview data using other preview data related to the preview data if the preview data is incomplete and the other preview data is already obtained.

19. A reservation processing method, comprising:
receiving broadcast data including mainview data and preview data, the preview data representing program information related to subsequent mainview data, the program information including a reservation item for broadcast of the subsequent mainview data;
recording the preview data received according to a reservation instruction;
extracting the reservation item of the subsequent mainview data from the preview data;

storing the reservation item in a reservation list; and recording the subsequent mainview data according to the reservation item stored in the reservation list when the subsequent mainview data is received.

20. computer-readable memory, comprising:

instruction means for causing a computer to receive broadcast data including mainview data and preview data, the preview data representing program information related to subsequent mainview data, the program information including a reservation item for broadcast of the subsequent mainview data;

instruction means for causing a computer to record the preview data received according to a reservation instruction;

instruction means for causing a computer to extract the reservation item of the subsequent mainview data from the preview data;

instruction means for causing a computer to store the reservation item in a reservation list; and instruction means for causing a computer to record the subsequent mainview data according to the reservation item stored in the reservation list when the subsequent mainview data is received.

21. A reservation processing apparatus, comprising:

a data receiving unit configured to receive broadcast data including mainview data and preview data, the preview data representing program information related to subsequent mainview data, the program information including a reservation item for broadcast of the subsequent mainview data;

a preview data record unit configured to record the preview data received by said data receiving unit according to a reservation instruction;

a reservation list management unit configured to extract the reservation item of the subsequent mainview data from the preview data and to store the reservation item in a reservation list; and a reservation item execution unit configured to record the subsequent mainview data according to the reservation item stored in the reservation list when said data receiving unit receives the subsequent mainview data.

* * * * *